United States Patent [19]
Boudreau et al.

[11] Patent Number: 5,880,525
[45] Date of Patent: Mar. 9, 1999

[54] ANODIC ALUMINUM OXIDE PASSIVE ALIGNMENT STRUCTURES

[75] Inventors: Robert Addison Boudreau, Hummelstown; Terry Patrick Bowen, Etters; Hongtao Han, Mechanicsburg; Songsheng Tan, Pittsburgh; John Robert Rowlette, Sr., Hummelstown, all of Pa.

[73] Assignee: The Whitaker Corporation, Wilmington, Del.

[21] Appl. No.: 379,778

[22] Filed: Jan. 27, 1995

[51] Int. Cl.$^6$ .......................... H01L 23/06; H01L 23/10; H01L 23/15; C01L 2/02
[52] U.S. Cl. .......................... 257/752; 257/703; 423/628
[58] Field of Search .................................. 423/625, 628; 257/703, 752

[56] References Cited

U.S. PATENT DOCUMENTS

| | | | |
|---|---|---|---|
| 4,056,681 | 11/1977 | Cook, Jr. .............................. | 174/52 FP |
| 4,814,943 | 3/1989 | Okuaki ..................................... | 361/400 |
| 5,198,693 | 3/1993 | Imken et al. ............................ | 257/720 |

OTHER PUBLICATIONS

"The Structure of Anodic Oxide Coatings"; Trans. Am. Institute Mining Meeting Engrs.; J.D. Edwards et al.; Feb. 1994. pp. 288–300.

*Journal of Electrochemical Society;* "An Investigation of Porous Anodic Oxide Films On Aluminum by Comparative Adsorption, Gravimetric and Electronoptical Measurements"; G. Paolini et al.; Jan. 1965. pp. 32–38.

*Applied Phys. Letter;* "Fabrication of a One–Dimensional Microhole Array by Anodic Oxidation of Aluminum"; Hideki Masuda et al.; Dec. 1993. pp. 3155–3157.

"Formation of Anodic Coatings on Aluminum"; Trans. Electrochem. Soc.; J. Edwards et al.; 1941. pp. 135–144 no month.

*J.E.C.S.;* "Magnetic Properties of Anodic Oxide Coatings on Aluminum Containing Electrodeposited Co and Co–Ni"; Satoshi Kawai et al.; 1975. pp. 32–36 no month.

"Mechanism Of Open–Circuit Dissolution of Porous Oxide Films on Aluminum In Acid Solutions"; M. Nagayama; 1971. pp. 133–136 no month.

*Nature;* "The Formation of Controlled–Porosity Membranes From Anodically Oxidized Aluminum"; R.C. Furneaux et al.; 1989. pp. 147–149 no month.

*Electrochemica Acta;* "Galvanoluminescience of Aluminum During Anodization in Non–Dissolving Electrolytes"; Ikonopisov et al.; 1978. pp. 1209–1214 no month.

*The Journal of the Electrochemical Society;* "The Anodic Treatment of Aluminum in Sulfuric Acid Solutions"; Roy C. Spooner; 1955. pp. 156–162.

*Electrochem Soc.;* "Magnetic Anisotrophy Of Electrodeposited Cobalt on Alumite Substrate"; Tien–Jen Cheng et al.; 1990. pp. 93–95 no month.

*Electrochemica Acta;* "Plating on Anodized Aluminum—I. The Mechanism of Charge Transfer Across The Barrier–Layer Oxide Film on 1100 Aluminum"; Gruberger et al.; 1986. pp. 1531–1540 no month.

*Electrochem Society;* "A Study of the Formation and Dissolution of Porous Anodic Oxide Films on Aluminum: Behavior of the Porous Layer"; Diggle et al.; Oct. 1969. pp. 1347–135.

*Corrosion Science;* "The Determination of the Porosity of Anodic Oxide Films on Aluminum By the Pore–Filling Method"; Takahashi et al.; 1978. pp. 911–925 no month.

(List continued on next page.)

Primary Examiner—Wael Fahmy
Assistant Examiner—Howard Weiss
Attorney, Agent, or Firm—W. Francos

[57] ABSTRACT

A passive alignment structure for a substantially planar substrate, which is an anodic aluminum oxide structure having a vertical profile with respect to a horizontal surface of said substantially planar substrate.

10 Claims, 4 Drawing Sheets

OTHER PUBLICATIONS

*Electrochenica Acta*; "Study of Aluminum Anodization in Sulphuric And Chromic Acid Solutions—II. Oxide Morphology and Structure"; Parkhutik et al; 1990. pp. 961–966 no month.

*Electrochemica Acta*; "Galvanoluminescience During the Pore–Filling of Anodic Films on Aluminum Formed in Sulphuric Acid"; Ikonopisov et al.; 1989. pp. 631–634 no month.

*Letter*; "Preparation of Microporous Metal Membranes by Two–Step Replication of the Microstructure of Anodic Alumina"; Masuda et al.; 1993. pp. 1–3 Thin Solid Films no month.

*Corrosion Science*; "Dissolution of Porous Anodic Oxide Films On Al IN $(COOH)_2$ Solutions"; Nagayama et al.; 1970. pp. 617–627 no month.

*Electrochemica Acta*; "Dissolution of the Anodic Oxide Film On Aluminum in a Sulphuric Acid Solution"; Nagayama et al.; 1967. pp. 1097–1107 no month.

*Journal of Electrochemical Society*; "Effect of Aluminum Sulfate in the Sulfuric Acid Electrolyte on Anodic Polarization"; R.B. Mason; Aug. 1956. pp. 425–429.

*Journal of Electrochemical Society*; "Anodic Behavior of Aluminum and Its Alloys in Sulfuric Acid Electrolytes"; R.B. Mason et al.; Feb. 1954. pp. 53–59.

*Journal of Elecctrochemical Society*; "Galvanic Corrosion Behavior of Titanium and Zirconium in Sulfuric Acid Solutions"; Schlain et al.; Mar. 1955. pp. 102–109.

*Journal of Elecctrochemical Society*; "Structural Features of Oxide Coatings on Aluminum"; Keller et al.; Sep. 1953. pp. 411–419.

*Nature*; "Nucleation and Growth of Porous Anodic Films on Aluminum"; Mar. 1978. pp. 433–435.

*Electrochemica Acta*;"On the Mechanism of Dissolution of Porous Axide Films on Aluminum During Anodizing"; Nagayama et al.; 1968. pp. 1773–1783 no month.

"Thickness of Anodic Coatings on Aluminum"; J.D. Edwards. pp. 959–965 no date.

ANODIC ALUMINUM OXIDE PASSIVE ALIGNMENT STRUCTURES

BACKGROUND OF THE INVENTION

FIELD OF THE INVENTION

In optoelectronic device technology it is often necessary to align optical devices which are mounted on a planar substrate, such as a silicon chip, with other discrete devices, such as other optical devices mounted on the same chip, or a separate chip, or with optical fibers.

It is known to form alignment structures, such as pedestals and standoffs using conventional silicon waferboard technology. For instance, Reactive Ion Etching (RIE) may be used to etch polyimide standoffs and even silicon alignment pedestals may be formed by RIE. However, RIE technology is very difficult and expensive and raises environmental concerns due to the chlorine-based reaction technologies used therein.

Furthermore, due to the nature of RIE, it is extremely difficult, if not impossible, to form tall vertical alignment pedestals. Typically, the vertical relief of structures formed by RIE averages 10 microns. Additionally, the vertical profile of the walls of structures formed by RIE is not quite vertical, due to imperfect anisotropic etching, which results in the walls of the structures so formed being at angles less than 90 degrees from the horizontal.

The known method of forming vertical structures by RIE also suffers from the difficulty of forming alignment V-grooves in the silicon substrate after the formation of the vertical alignment structures. The previously formed vertical structures interfere with the application of the photoresist, generally applied by the spin-on technique, such that it is difficult to form a resist coating with a uniform thickness. Unfortunately, the V-grooves can not be formed prior to formation of the vertical alignment structures, since the thermal oxide RIE masking material, grown on the surface of the substrate, will also be grown on the surfaces of the V-grooves, thereby adversely affecting the accuracy of the V-groove alignment.

The use of polymeric alignment structures is less than desirable, especially in a high-throughput, production environment, due to processing difficulties, reliability concerns and poor accuracy in the z-axis (vertical).

SUMMARY OF THE INVENTION

The present invention is directed to the use of anodic aluminum oxide for making vertical alignment structures on planar substrates for passive alignment of devices thereon.

Accordingly, an embodiment of the present invention is a passive alignment structure for a substantially planar substrate, comprising an anodic aluminum oxide structure having a vertical profile with respect to a horizontal surface of said substantially planar substrate.

Another embodiment of the present invention is a passive alignment structure for a substantially planar substrate comprising an anodic aluminum oxide structure having a vertical profile with respect to a horizontal surface of said substantially planar substrate, formed by a process comprising the steps of (i) providing a layer of aluminum on the horizontal surface of said substantially planar substrate; (ii) fully or partially oxidizing said layer of aluminum using an anodic aluminum oxidation technique to form an anodic aluminum oxide layer; and (iii) patterning and etching said anodic aluminum oxide layer by photolithography and etching techniques.

A third embodiment of the present invention is a board device comprising a substantially planar substrate and an anodic aluminum oxide passive alignment structure having a vertical profile with respect to a horizontal surface of said substantially planar substrate.

The passive alignment structure may have any of a variety of forms, e.g. pins, pedestals, a ridge or a series of substantially parallel or corrugated, horizontal ridges. However, the variations of the present invention should not be construed to be limited to the above-mentioned examples.

BRIEF DESCRIPTION OF THE DRAWINGS

The above and other objects, features and advantages of the present invention will be better understood from the following detailed descriptions taken in conjunction with the accompanying drawings, all of which are give by way of illustration only, and are not limitative of the present invention.

DETAILED DESCRIPTION OF THE INVENTION

Figure 1:
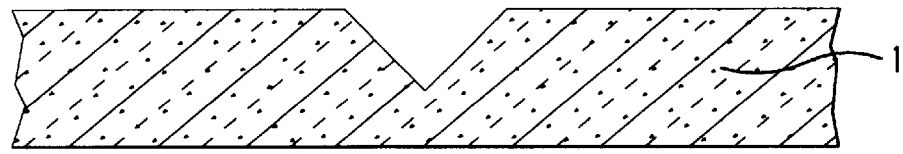
FIGS. 1–5 illustrate the process of the present invention, wherein a substrate is covered with an aluminum film; the aluminum film is anodized to form aluminum oxide, which is photomasked and subsequently etched, thus forming the alignment structures.

The following detailed description of the invention is provided to aid those skilled in the art in practicing the present invention. Even so, the following detailed description of the invention should not be construed to unduly limit the present invention, as modifications and variations in the embodiments herein discussed may be made by those of ordinary skill in the art without departing from the spirit or scope of the present inventive discovery.

The present invention is directed to a passive alignment structure for a substantially planar substrate, comprising an anodic aluminum oxide structure having a vertical profile with respect to a horizontal surface of said substantially planar substrate.

The passive alignment structure of the present invention may be formed by a process comprising the steps of (i) providing a layer of aluminum on the horizontal surface of said substantially planar substrate; (ii) fully or partially oxidizing said layer of aluminum using an anodic aluminum oxidation technique to form an anodic aluminum oxide layer; and (iii) patterning and etching said anodic aluminum oxide layer by photolithography and etching techniques.

The use of anodic aluminum oxide structures for passive alignment of optoelectronic components is a novel and low cost processing technique, lending itself to batch processing. Vertical microchannels are formed in the anodic aluminum oxide structures during the oxidation/anodization step, which microchannels permit etching solution to enter the aluminum oxide layer, wherever it is unprotected by a mask. Accordingly, the unprotected aluminum oxide layer is etched from top to bottom, and therefore much more quickly than the portions of the aluminum oxide layer under the mask, in which no etching solution is permitted to enter the existing microchannels.

The overall effect is an anisotropic etching of the anodic aluminum oxide layer, such that the portions of the layer unprotected by the mask are etched, resulting in a tall vertical profile.

The anodic oxidation of the deposited aluminum layer is performed in a conventional manner, such as in a dilute acid solution, e.g. sulfuric, phosphoric, oxalic or chromic acid. During anodic oxidation, the aluminum layer may be totally consumed or only partially consumed, a condition which may be advantageous, since any remaining aluminum layer will retain its thermal and electrical conductivity. As the anodic oxidation process consumes the aluminum layer, there is a relationship between the consumed thickness of aluminum and the aluminum oxide thickness, such that the height of alignment structures formed may be predicted.

Because of the vertical microchannels formed in the aluminum oxide layer, and the excellent anisotropic etching ability, vertical structures of at least 50 microns high, and up to several millimeters high and having an aspect ratio of 100:1 or greater, height to width, may be formed on the planar surface. The height of such structures provides a new opportunity for use of those structures in alignment of optoelectronic components utilized, for instance, in silicon waferboard technology. However, the use of these microstructures should not be construed to be limited to silicon waferboards, since the method of forming these structures may be applicable to any number of planar substrates, such as glass, ceramic, silicon dioxide, GaAs, InP and metals, particularly aluminum. Additionally, it would be obvious to those skilled in the art that the anodic aluminum oxide microstructures of the present invention can be fabricated directly onto device chips.

The anodic aluminum oxide microstructures of the present invention may be formed into a variety of alignment structures, such as alignment pedestals or ridges (for the horizontal, x/y-directions), standoffs (for the vertical, z-direction) and alignment guide pins, for accurate positioning of devices on the planar substrate, such as optoelectronic devices or alignment with other devices, not integral with the planar substrate, such as optical fibers. Examples of optoelectronic devices are optical waveguides, edge emitting lasers and laser arrays and surface active devices, such as surface emitting lasers, laser arrays, light emitting diodes, detectors, holographic elements, etc. Additionally, the alignment structures of the present invention may be patterned to provide support and alignment for optical fibers to be aligned with optoelectronic devices present on the planar substrate (pigtail devices). The anodic aluminum oxide structures of the present invention may have sufficient vertical relief to support an optical fiber vertically, or normal to the planar substrate, such as by forming an annular ring around the optoelectronic device, of sufficient inner diameter to support an optical fiber. Alternatively, the alignment structures may be formed horizontally, or parallel to the surface of the planar substrate, such as in the form of a plurality of substantially parallel ridges, having vertical relief, so as to support one or a series of optical fibers along the horizontal surface and in alignment with an optoelectronic device on the planar substrate. The horizontal ridges may be formed in a variety of shapes, including in a corrugated or sinusoidal form, as viewed from above (see FIG. 12), wherein the optical fiber(s) is held in place by a number of discrete contact points, formed by the apexes of the corrugated or sinusoidal shapes, on opposite sides of the fiber(s). This method of horizontally supporting optical fibers on the planar substrate may be particularly advantageous when the planar substrate is made of a material not conducive to forming alignment V-grooves, such as glass. In this embodiment, illustrated in FIGS. 11 and 12, the optical fiber(s) may be "snapped into" the space between the parallel ridges.

The aluminum layer which is provided on the planar substrate, prior to the anodic oxidation step, may be provided in any number of ways. An aluminum sheet may be bonded to the substrate by electrostatic bonding, solid state aluminum oxide bonding or even with a suitable adhesive. Alternatively, aluminum may be deposited on the substrate by such methods as plating, vacuum evaporation and deposition or sputtering. If necessary, the substrate may be provided with an adhesion promoting layer for the aluminum layer, or adhesion may be promoted by a thermal treatment of the planar substrate.

Another benefit of the vertical microchannels is that they may be filled or doped with other atoms, such as electrically or thermally conducting or semi-conducting atoms, in order to modify the thermal or electrical conductivity in the vertical, or z-direction. Therefore, anisotropy of thermal and/or electrical conductivity can be established in the anodic aluminum oxide film, resulting in its use as a heat sink or an electrical conducting path.

FIG. 1 is a cross-sectional illustration of a substantially planar substrate, 1, having a V-groove disposed therein.

Figure 2:
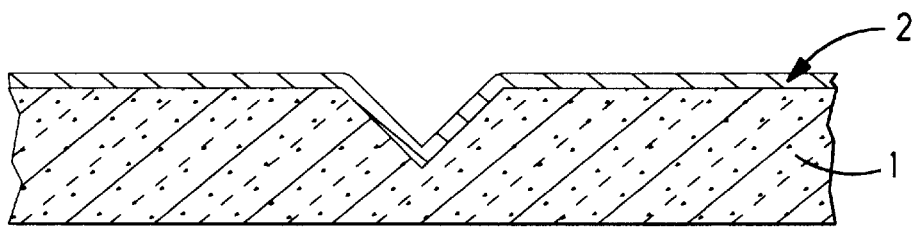

FIG. 2 illustrates the incorporation of a layer of aluminum, 2, on the substantially planar substrate.

Figure 3:
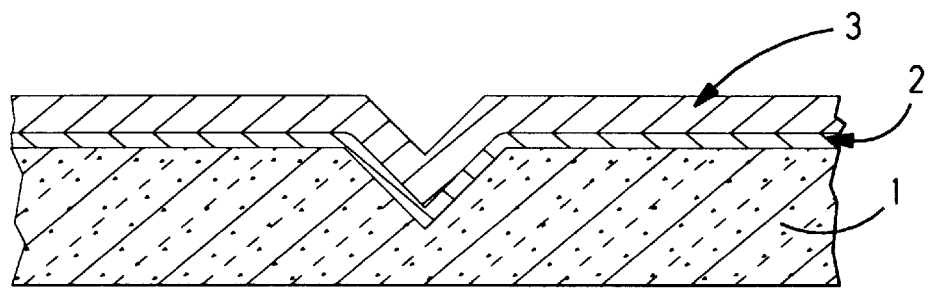

FIG. 3 illustrates the anodization step, wherein a layer of aluminum oxide, 3, is formed on top of the layer of aluminum, 2.

Figure 4:
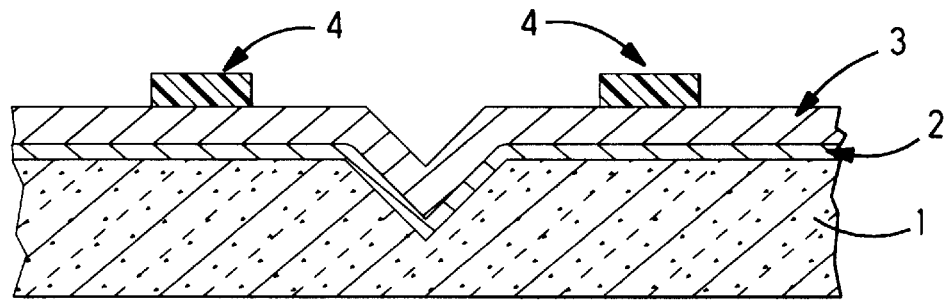

FIG. 4 illustrates the masking step, wherein a mask, 4, such as a photomask, is patterned on top of the aluminum oxide layer, 3, so as to define the position and form of the desired alignment structure(s).

Figure 5:
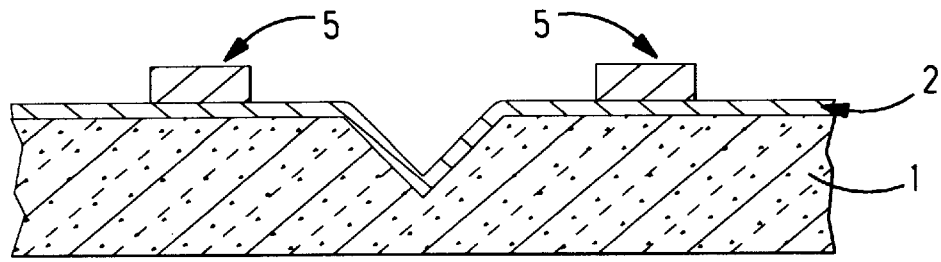

FIG. 5 illustrates the alignment structures, 5, formed by etching the masked structure of FIG. 4.

A specific embodiment of the present invention is a board device comprising a substantially planar substrate and an anodic aluminum oxide passive alignment structure having a vertical profile with respect to a horizontal surface of said substantially planar substrate.

Figure 6:
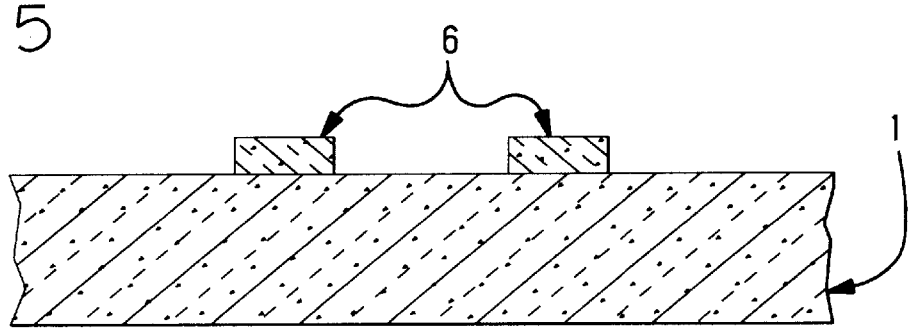
FIGS. 6–8 illustrate cross-sections of a substantially planar substrate having devices thereon, and two possible embodiments of alignment structures.

FIG. 6 is a cross-section of a planar substrate, 1, having disposed thereon devices, 6, such as optoelectronic devices.

Figure 7:
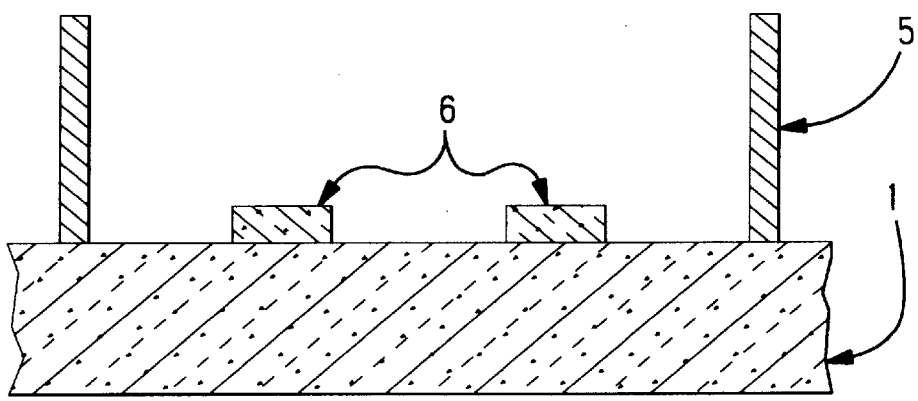

FIG. 7 is a cross-section of the planar substrate of FIG. 6, with aluminum oxide alignment pins, 5, formed according to the process of the present invention.

Figure 8:
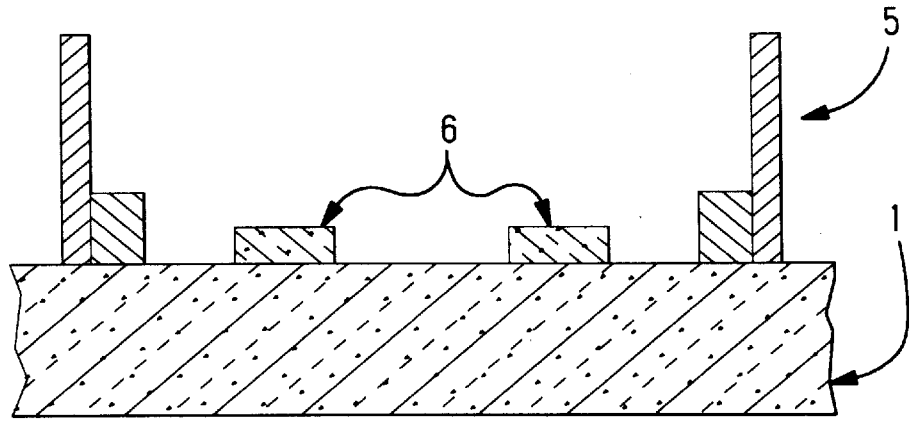

FIG. 8 is a cross-section of the planar substrate of FIG. 6, illustrating an alternative embodiment as to the aluminum oxide alignment pins, 5.

Figure 9:
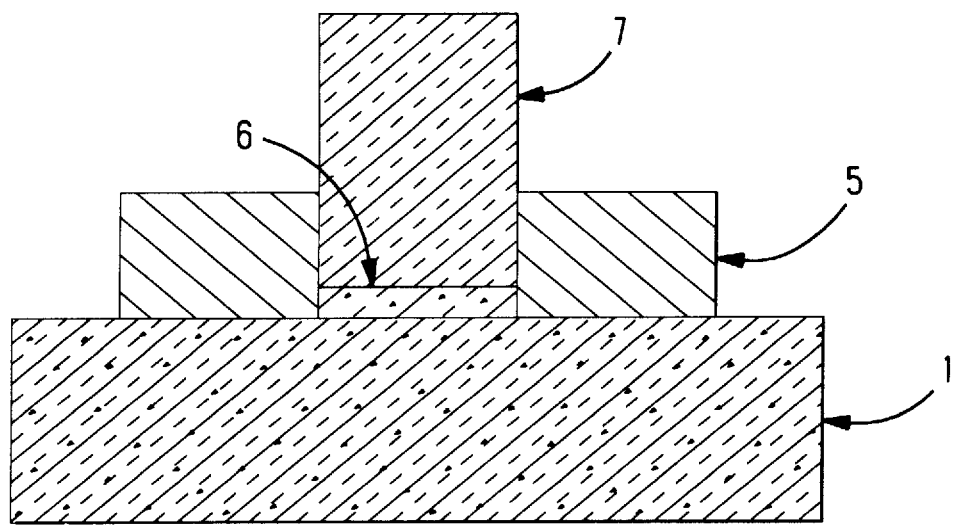
FIGS. 9 and 10 illustrate cross-sections of an optoelectronic device, with annular alignment structures forming a pigtail with an optical fiber.
Figure 10:
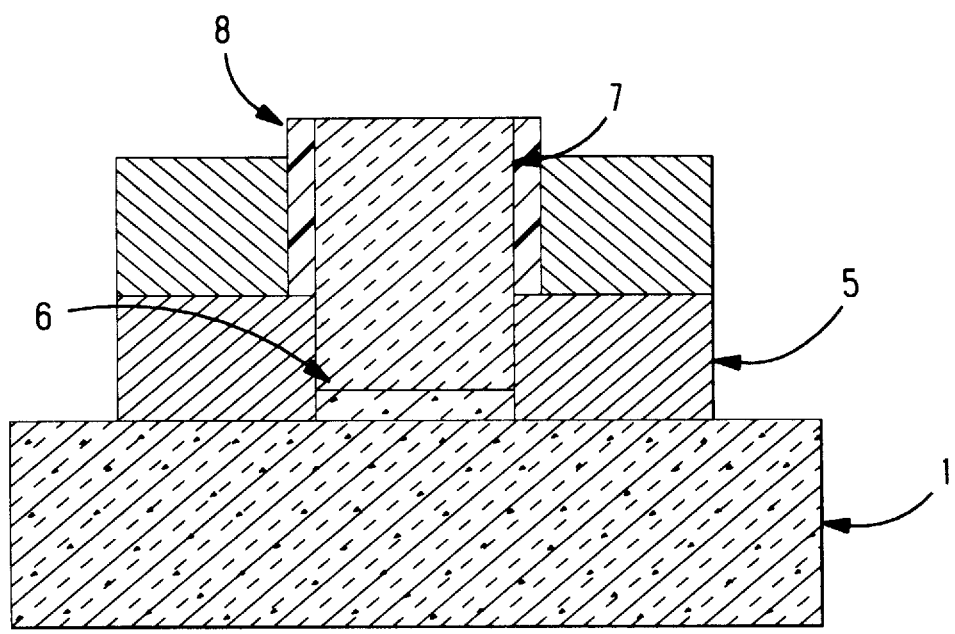

FIGS. 9 and 10 are cross-sectional illustrations of optoelectronic pigtail devices, wherein a substrate, 1, has formed thereon a surface active device, 6, and annular alignment structures, 5, according to the process of the present invention. The alignment structures have a sufficient vertical profile to passively align an optical fiber, 7, and may be configured to align both the optical fiber, 7, and any coating thereon, 8, including polymeric coatings or claddings, such as for a D-fiber.

Figure 11:
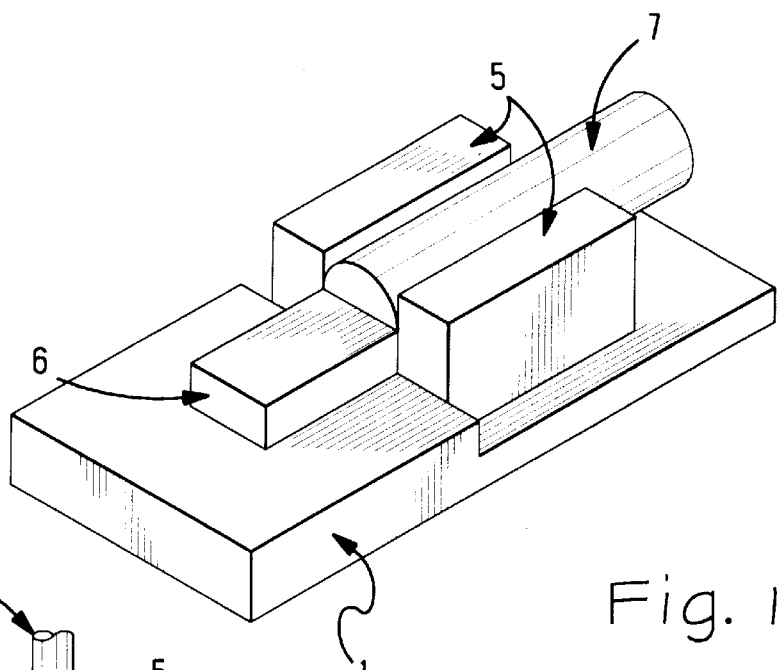
FIG. 11 illustrates an embodiment of the present invention wherein the vertical alignment structures are in the form of parallel ridges in the horizontal plane, for holding an optical fiber between the ridges.

FIG. 11 is a perspective view of a board device having a substrate, 1, with vertical alignment structures formed thereon, 5, according to the present invention, in the form of parallel horizontal ridges, wherein the ridges are so spaced to hold an optical fiber, 7, firmly therebetween and in alignment with an optoelectronic device, 6.

Figure 12:
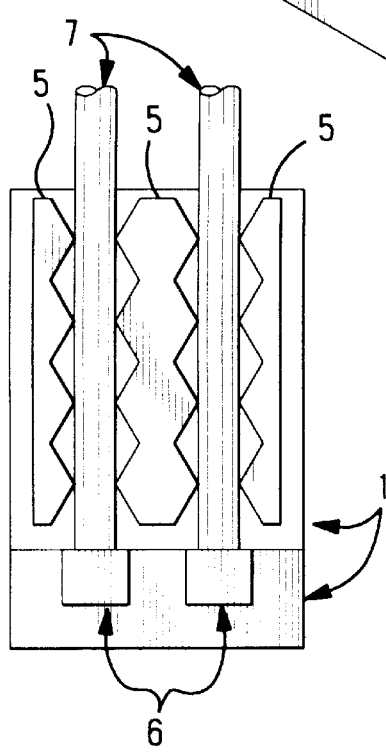
FIG. 12 is a top view illustrating corrugated horizontal ridge alignment structures, with vertical relief, according to the present invention.

FIG. 12 is a top view of a board device wherein an array of optoelectronic devices, 6, is mounted on a substrate, 1. Optical fibers, 7, are held in passive alignment with said optoelectronic device array by the apexes of corrugated horizontal ridges of anodic aluminum oxide, 5, formed according to the present invention.

Figure 13:
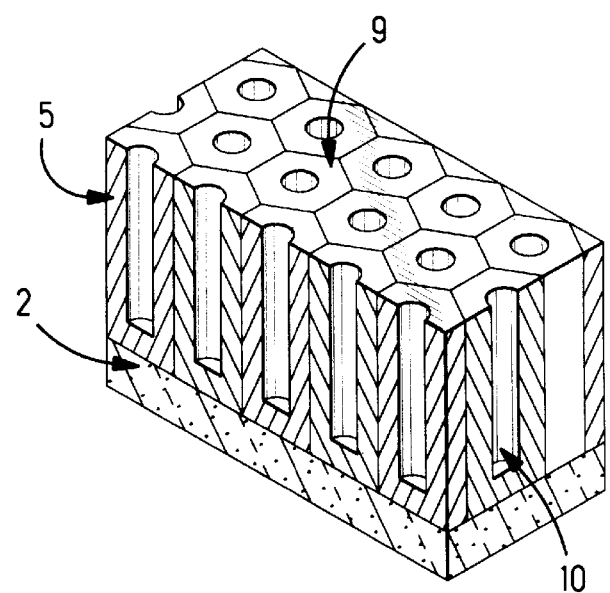
FIG. 13 is a diagram illustrating the microchannels or pores within the hexagonal anodic aluminum oxide cells of the structures of the present invention.

FIG. 13 is a diagram of the microchannels or pores, 10, within the anodic aluminum oxide structures, 5, of the present invention. Note that the aluminum oxide columns are essentially hexagonal in cross-section, 9.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A passive alignment structure for a substantially planar substrate, comprising:

an anodic aluminum oxide structure having a vertical profile with respect to a horizontal surface of said substantially planar substrate, said anodic aluminum oxide structure being in the form of a standoff.

2. A passive alignment structure as recited in claim 1 wherein said anodic aluminum oxide structure is formed on a layer of aluminum provided on said surface of said substantially planar substrate.

3. A passive alignment structure for a substantially planar substrate, comprising an anodic aluminum oxide structure having a vertical profile with respect to a horizontal surface of said substantially planar substrate, said anodic aluminum oxide structure being in the form of corrugated horizontal ridges.

4. A passive alignment structure as recited in claim 3 wherein said anodic aluminum oxide structure is formed on top of a layer of aluminum provided on said surface of said substantially planar substrate.

5. A passive alignment structure for a substantially planar substrate comprising:

an anodic aluminum oxide structure having a vertical profile with respect to a horizontal surface of said substantially planar substrate, said anodic aluminum oxide structure being in the form of a pedestal.

6. A passive alignment structure as recited in claim 5 wherein said anodic aluminum oxide structure is formed on top of a layer of aluminum provided on said surface of said substantially planar substrate.

7. A passive alignment structure comprising a substantially planer non-aluminum substrate; and an anodic aluminum oxide structure having a vertical profile with respect to a horizontal surface of said substantially planer substrate, said anodic aluminum oxide structure being in the form of a stand-off.

8. A passive alignment structure comprising a substantially planer non-aluminum substrate; and an anodic aluminum oxide structure having a vertical profile with respect to a horizontal surface of said substantially planer substrate, said anodic aluminum oxide structure being in the form of corrugated, horizontal ridges.

9. A passive alignment structure comprising a substantially planer non-aluminum substrate; and an anodic aluminum oxide structure having a vertical profile with respect to a horizontal surface of said substantially planer substrate, said anodic aluminum oxide structure being in the form of a pedestal.

10. A passive alignment structure comprising a substantially planer non-aluminum substrate; and an anodic aluminum oxide structure having a vertical profile with respect to a horizontal surface of said substantially planer substrate, said anodic aluminum oxide structure having an aspect ratio of 100:1 or greater height-to-width, above said horizontal surface of said substantially planer substrate.

* * * * *